US010607741B2

(12) United States Patent
Korhonen et al.

(10) Patent No.: US 10,607,741 B2
(45) Date of Patent: Mar. 31, 2020

(54) SAFETY CRITICAL SYSTEM

(71) Applicant: Fortum Oyj, Espoo (FI)

(72) Inventors: Jarmo Korhonen, Fortum (FI); Pekka Nuutinen, Fortum (FI)

(73) Assignee: Fortum Oyj, Espoo (FI)

( * ) Notice: Subject to any disclaimer, the term of this patent is extended or adjusted under 35 U.S.C. 154(b) by 218 days.

(21) Appl. No.: 15/546,685

(22) PCT Filed: Feb. 1, 2016

(86) PCT No.: PCT/FI2016/050061
§ 371 (c)(1),
(2) Date: Jul. 27, 2017

(87) PCT Pub. No.: WO2016/120532
PCT Pub. Date: Aug. 4, 2016

(65) Prior Publication Data
US 2018/0019030 A1    Jan. 18, 2018

(30) Foreign Application Priority Data
Jan. 30, 2015    (FI) ...................................... 20155069

(51) Int. Cl.
*G21D 3/00*    (2006.01)
*B64D 45/00*   (2006.01)
(Continued)

(52) U.S. Cl.
CPC .............. *G21D 3/04* (2013.01); *B64D 45/00* (2013.01); *G05B 9/03* (2013.01); *G05B 19/0428* (2013.01);
(Continued)

(58) Field of Classification Search
CPC . G21D 3/04; G21D 3/001; G21D 3/06; B64D 45/00; G05B 9/03; G05B 19/0428;
(Continued)

(56) References Cited

U.S. PATENT DOCUMENTS 4,632,802 A    12/1986 Herbst et al.
6,038,277 A *   3/2000 Imase .................... G21C 17/00
                                                      376/259
(Continued)

FOREIGN PATENT DOCUMENTS

EP          2867270 A1    11/2013
KR      20140068519 A     6/2014

OTHER PUBLICATIONS

Lala et al. "Architectural Principles for Safety-Critical Real-Time Applications" (retrieved from https://www.cs.unc.edu/~anderson/teach/comp790/papers/safety_critical_arch.pdf) Proceedings of the IEEE, vol. 82, No. I , Jan. 1994 (Year: 1994).*

(Continued)

*Primary Examiner* — Sujay Koneru
(74) *Attorney, Agent, or Firm* — Laine IP Oy

(57) ABSTRACT

According to an example embodiment of the present invention, there is provided a method, comprising defining a task category information element, the task category information element being associated with at least one functional requirement and at least one design principle, associating the task category information element with at least one architecture definition information element, associating each of the at least one architecture definition information element with at least one system-level information element, and verifying the system described by the at least one architecture definition information element and associated system-level information elements is compliant with the at least one design principle.

8 Claims, 7 Drawing Sheets

(51) Int. Cl.
*G05B 9/03* (2006.01)
*G05B 19/042* (2006.01)
*G06F 11/30* (2006.01)
*G06Q 10/06* (2012.01)
*G06F 16/22* (2019.01)
*G21D 3/04* (2006.01)
*G21D 3/06* (2006.01)

(52) U.S. Cl.
CPC ...... *G06F 11/3013* (2013.01); *G06F 11/3058* (2013.01); *G06Q 10/06* (2013.01); *G21D 3/001* (2013.01); *G21D 3/06* (2013.01); *G05B 2219/24015* (2013.01); *G06F 16/22* (2019.01); *Y02E 30/40* (2013.01)

(58) Field of Classification Search
CPC .. G06F 11/3013; G06F 11/3058; G06F 16/22; G06Q 10/06; G06B 2219/24015; Y02E 30/40
See application file for complete search history.

(56) References Cited

U.S. PATENT DOCUMENTS

| | | | | |
|---|---|---|---|---|
| 6,212,649 | B1* | 4/2001 | Yalowitz | G06F 11/1479 709/201 |
| 2003/0101251 | A1* | 5/2003 | Low | G06F 8/34 709/223 |
| 2004/0054831 | A1* | 3/2004 | Johansson | G06F 13/102 710/200 |
| 2004/0095907 | A1* | 5/2004 | Agee | H04B 7/0417 370/334 |
| 2005/0015227 | A1* | 1/2005 | Kropaczek | G21C 3/00 703/6 |
| 2008/0288121 | A1 | 11/2008 | Fedosovskiy et al. | |
| 2009/0067565 | A1* | 3/2009 | Eckardt | F16K 17/003 376/283 |
| 2011/0119195 | A1* | 5/2011 | McLees | G06Q 10/06 705/301 |
| 2013/0249948 | A1* | 9/2013 | Reitan | G06F 3/011 345/633 |
| 2014/0133618 | A1* | 5/2014 | Graham | G21D 3/008 376/207 |
| 2015/0227161 | A1* | 8/2015 | Kakunda | G06F 1/06 713/502 |
| 2016/0117210 | A1* | 4/2016 | Reichenbach | G06F 11/0712 714/37 |

OTHER PUBLICATIONS

Electric Power Research Institute; CAFTA Fault Tree Analysis, Jul. 2007.
NASA: Fault Tree Handbook with Aerospace Applications, Aug. 2002.
Peplow, D.E. et al: Calculating Nuclear Power Plant Vulnerability Using Integrated Geometry and Event/Fault Tree Models. Nuclear Science and Engineering 146, 71-87 (2004).
Wikipedia: Fault tree analysis.

* cited by examiner

SAFETY CRITICAL SYSTEM

FIELD OF INVENTION

The present invention relates to the field of ensuring, enhancing and maintaining safety in safety critical systems.

BACKGROUND OF INVENTION

Safety critical systems, such as, for example, nuclear power stations and civilian aircraft are designed to safety standards. Safety standards may be set by national or international regulators, standard-setting bodies or certification agencies, for example. Safety standards may be defined for industries as a whole, for system classes or for individual systems, for example. Even in the absence of formal safety standards, equipment in a system may be designed with safety rules when this is seen as desirable, for example to protect biodiversity.

A fission reactor, for example, must be designed and constructed in a way that enables operators to control its functioning. Such controlling may comprise, if necessary, causing the reactor to transition to a managed idle state when instructed. Such an idle state may comprise a state where fission reactions are subcritical and decay heat is removed from the reactor core to prevent its overheating, which might otherwise damage the core of the reactor, potentially leading to release of radionuclides.

A civilian aircraft, on the other hand, may be safely operated only in case the aircraft can be reliably flown even when aircraft systems develop fault conditions. For example, in case a flight computer develops a fault, pilots must be able to continue providing meaningful control inputs to the aircraft to continue its safe flight.

To obtain safe operability in safety-critical systems, components comprised in such systems may be associated with safety conditions. For example, a flight computer may be made redundant, wherein an aircraft may be furnished with a plurality of flight computers, each individually being capable of controlling the flight. In this case, redundancy is a safety condition associated with the flight computer. In case of a fault condition in one of the flight computers, another one of the flight computers may assume the task of controlling the flight, the faulty flight computer being set to an inactive state.

In conventional systems, in case a component is replaced and the component is associated with a safety condition, then the replacement component becomes associated with the safety condition as well. This occurs since the safety condition operates on the component level. In some systems, replacing a component may be constrained to a replacement part that to a maximum extent possible resembles the replaced part.

SUMMARY OF THE INVENTION

The invention is defined by the features of the independent claims. Some specific embodiments are defined in the dependent claims.

According to a first aspect of the present invention, there is provided a method, comprising defining a task category information element, the task category information element being associated with at least one functional requirement and at least one design principle, associating the task category information element with at least one architecture definition information element, associating each of the at least one architecture definition information element with at least one system-level information element, and verifying the system described by the at least one architecture definition information element and associated system-level information elements is compliant with the at least one design principle.

Various embodiments of the first aspect may comprise at least one feature from the following bulleted list:
- each system-level information element is associated with at least one equipment information element
- the method further comprises defining a second task category information element, and associating the second task category information element with at least one architecture definition information element
- the at least one functional requirement is comprised in the following list: reactivity control, core cooling, confinement of radioactive substances, controlling flight, communications, preventive protection, reactor protection, automatic back-up, manual back-up, manual accident management, back-up of manual accident management, safe shut-down
- at least one of the at least one architecture definition information element is comprised in the following list: functional architecture definition information element, automation architecture definition information element, process and electrical architecture definition information element, control room architecture definition information element and layout architecture definition information element
- at least one of the at least one system-level information element is comprised in the following list: preventive protection system information element, preventive actuation and indication system information element, safety injection system information element, emergency power supply system information element, digital HMI system information element and automatic backup system information element
- the method further comprises storing the task category information element, each of the at least one architecture definition information element and each of the at least one system-level information element in a database system
- the verified system comprises a nuclear power station or an aircraft
- the method is performed, at least in part, in the database system.

According to a second aspect of the present invention, there is provided a method, comprising recording a first change in an information element in a database system, the database system storing a task category information element, at least one architecture definition information element and at least one system-level information element, and verifying the system described by the at least one architecture definition information element and system-level information elements associated with the at least one architecture definition information element is compliant with at least one design principle, wherein the task category information element is associated with at least one functional requirement and at the least one design principle.

Various embodiments of the second aspect may comprise at least one feature from the following bulleted list:
- the database further comprises at least one equipment information element
- the task category information element is associated with the at least one architecture definition information element and each of the at least one architecture definition information element is associated with at least one of the at least one system-level information element responsive to the verification indicating the system does not comply with the at least one design principle, the method comprises recording a second change in the database system and performing a second verification as to whether the system complies with the at least one design principle the second change does not modify the same information element as the first change at least one of the at least one architecture definition information element is comprised in the following list: functional architecture definition information element, automation architecture definition information element, process and electrical architecture definition information element, control room architecture definition information element and layout architecture definition information element at least one of the at least one system-level information element is comprised in the following list: preventive protection system information element, preventive actuation and indication system information element, safety injection system information element, emergency power supply system information element, digital HMI system information element and automatic backup system information element the at least one design principle: comprises at least one of the following: redundancy, diversity, separation, isolation, quality level, reliability level, seismic qualification and environmental condition qualification the at least one functional requirement is comprised in the following list: reactivity control, core cooling, confinement of radioactive substances, controlling flight, communications, preventive protection, reactor protection, automatic back-up, manual back-up, manual accident management, back-up of manual accident management, safe shut-down.

According to a third aspect of the present invention, there is provided a database system, comprising a task category database configured to store at least one task category information element, each task category information element being associated with at least one functional requirement and at least one design principle, an architecture database configured to store at least one architecture definition information element, a system database configured to store at least one system-level information element, wherein each of the at least one task category information element is associated with at least one architecture definition information element and each of the at least one architecture definition information element is associated with at least one system-level information element.

Various embodiments of the third aspect may comprise at least one feature from the following bulleted list:

an equipment database configured to store at least one equipment information element the task category database is interfaced with the architecture database via a first database relation, and the architecture database is interfaced with the system database via a second database relation the system database is interfaced with the equipment database via a third database relation at least one of the at least one architecture definition information element is comprised in the following list: functional architecture definition information element, automation architecture definition information element, process and electrical architecture definition information element, control room architecture definition information element and layout architecture definition information element least one of the at least one system-level information element is comprised in the following list: preventive protection system information element, preventive actuation and indication system information element, safety injection system information element, emergency power supply system information element, digital HMI system information element and automatic backup system information element the at least one design principle comprises at least one of the following: redundancy, diversity, separation, isolation, quality level, reliability level, seismic qualification and environmental condition qualification the at least one functional requirement is comprised in the following list: core, cooling, controlling flight and communications the database system stores sequence information elements, each sequence information element describing a sequence of actions, each sequence information element being associated with a triggering event and each sequence information element being associated with a task category information element.

According to a fourth aspect of the present invention, there is provided a computerized nuclear power station monitoring system, comprising a memory configured to store a database comprising a task category database comprising plurality of task category information elements comprising a safety function information element and a reactor protection information element, each task category information element being associated with at least one technical functional requirement and at least one technical design principle, each technical design principle being comprised in a technical design principle list, the technical design principle list comprising redundancy, diversity, separation and isolation, each functional requirement being comprised in a functional requirement list, the functional requirement list comprising reactivity control, core cooling and safe shut-down, and an equipment database configured to store at least one equipment information element, and at least one processor configured to, responsive to receipt in the computerized monitoring system of a failure notification concerning a first equipment information element, determine, using the database, a set comprising each technical design principle associated with each task category information element associated, via database relations, with the first equipment information element, and to identify, based on each technical design principle comprised in the set, a technical constraint of an action compensating, at least partly, effects of the failure identifier in the failure notification.

Various embodiments of the fourth, sixth or eighth aspect may comprise at least one feature from the following bulleted list:

the at least one processor is configured to determine a constraint of increased unit count responsive to the set comprising the technical design principle redundancy the at least one processor is configured to determine a constraint of principle of action responsive to the set comprising the technical design principle diversity the at least one processor is configured to determine a constraint of location responsive to the set comprising the technical design principle separation the at least one processor is configured to determine a constraint of physical separation responsive to the set comprising the technical design principle isolation the at least one processor is further configured to provide an indication of the determined constraints.

According to a fifth aspect of the present invention, there is provided a method in a computerized nuclear power station monitoring system, comprising storing a database comprising a task category database comprising a plurality of task category information elements comprising a safety function information element and a reactor protection information element, each task category information element being associated with at least one technical functional requirement and at least one technical design principle, each technical design principle being comprised in a technical design principle list, the technical design principle list comprising redundancy, diversity, separation and isolation, each functional requirement being comprised in a functional requirement list, the functional requirement list comprising reactivity control, core cooling and safe shut-down, and an equipment database configured to store at least one equipment information element, determining, responsive to receipt in the computerized monitoring system of a failure notification concerning a first equipment information element, using the database, a set comprising each technical design principle associated with each task category information element associated, via database relations, with the first equipment information element, and identifying, based on each technical design principle comprised in the set, a technical constraint of an action compensating, at least partly, effects of the failure identifier in the failure notification.

According to a sixth aspect of the present invention, there is provided a computerized communication network monitoring system, comprising a memory configured to store a database comprising a task category database comprising plurality of task category information elements comprising a switching failure elimination information element and a privacy information element, each task category information element being associated with at least one technical functional requirement and at least one technical design principle, each technical design principle being comprised in a technical design principle list, the technical design principle list comprising redundancy, diversity, separation and isolation, each functional requirement being comprised in a functional requirement list, the functional requirement list comprising subscription uniqueness, data encryption, subscriber identification and radio resource management, and an equipment database configured to store at least one equipment information element, and at least one processor configured to, responsive to receipt in the computerized monitoring system of a failure notification concerning a first equipment information element, determine, using the database, a set comprising each technical design principle associated with each task category information element associated, via database relations, with the first equipment information element, and to identify, based on each technical design principle comprised in the set, a technical constraint of an action compensating, at least partly, effects of the failure identifier in the failure notification.

According to a seventh aspect of the present invention, there is provided a method in a computerized communication network monitoring system, comprising storing a database comprising a task category database comprising a plurality of task category information elements comprising a switching failure elimination information element and a privacy information element, each task category information element being associated with at least one technical functional requirement and at least one technical design principle, each technical design principle being comprised in a technical design principle list, the technical design principle list comprising redundancy, diversity, separation and isolation, each functional requirement being comprised in a functional requirement list, the functional requirement list comprising subscription uniqueness, data encryption, subscriber identification and radio resource management, and an equipment database configured to store at least one equipment information element, determining, responsive to receipt in the computerized monitoring system of a failure notification concerning a first equipment information element, using the database, a set comprising each technical design principle associated with each task category information element associated, via database relations, with the first equipment information element, and identifying, based on each technical design principle comprised in the set, a technical constraint of an action compensating, at least partly, effects of the failure identifier in the failure notification According to an eighth aspect of the present invention, there is provided a computerized power distribution network monitoring system, comprising a memory configured to store a database comprising a task category database comprising a plurality of task category information elements comprising a frequency control information element and a safe installation information element, each task category information element being associated with at least one technical functional requirement and at least one technical design principle, each technical design principle being comprised in a technical design principle list, the technical design principle list comprising redundancy, diversity, separation and isolation, each functional requirement being comprised in a functional requirement list, the functional requirement list comprising production ramp-up, demand ramp-up and electrical isolation, and an equipment database configured to store at least one equipment information element, and at least one processor configured to, responsive to receipt in the computerized monitoring system of a failure notification concerning a first equipment information element, determine, using the database, a set comprising each technical design principle associated with each task category information element associated, via database relations, with the first equipment information element, and to identify, based on each technical design principle comprised in the set, a technical constraint of an action compensating, at least partly, effects of the failure identifier in the failure notification.

According to a ninth aspect of the present invention, there is provided a method in a power distribution network monitoring system, comprising storing a database comprising a task category database comprising a plurality of task category information elements comprising a frequency control information element and a safe installation information element, each task category information element being associated with at least one technical functional requirement and at least one technical design principle, each technical design principle being comprised in a technical design principle list, the technical design principle list comprising redundancy, diversity, separation and isolation, each functional requirement being comprised in a functional requirement list, the functional requirement list comprising production ramp-up, demand ramp-up and electrical isolation, and an equipment database configured to store at least one equipment information element, determining, responsive to receipt in the computerized monitoring system of a failure notification concerning a first equipment information element, using the database, a set comprising each technical design principle associated with each task category information element associated, via database relations, with the first equipment information element, and identifying, based on each technical design principle comprised in the set, a technical constraint of an action compensating, at least partly, effects of the failure identifier in the failure notification.

According to a tenth aspect of the present invention, computer programs are provided to cause a method in accordance with the second, fifth, seventh or ninth aspect to be performed.

INDUSTRIAL APPLICABILITY

At least some embodiments of the present invention find application in optimizing safety critical systems such as nuclear power generation and/or aircraft systems. Further examples of suitable systems include communication networks and power distribution networks.

DETAILED DESCRIPTION OF EXAMPLE EMBODIMENTS

By assigning design principles to functional requirements, more efficient implementation and maintenance of safety critical systems may be obtained. Where design principles, such as redundancy or diversity, are assigned to individual equipment rather than higher-level functional requirements, over-implementation or degradation of a safety level may occur and/or refitting existing safety critical systems may be more constrained by equipment-specific requirements. By assigning design principles to functional task categories rather than individual equipment, more flexible implementation is enabled.

Figure 1:
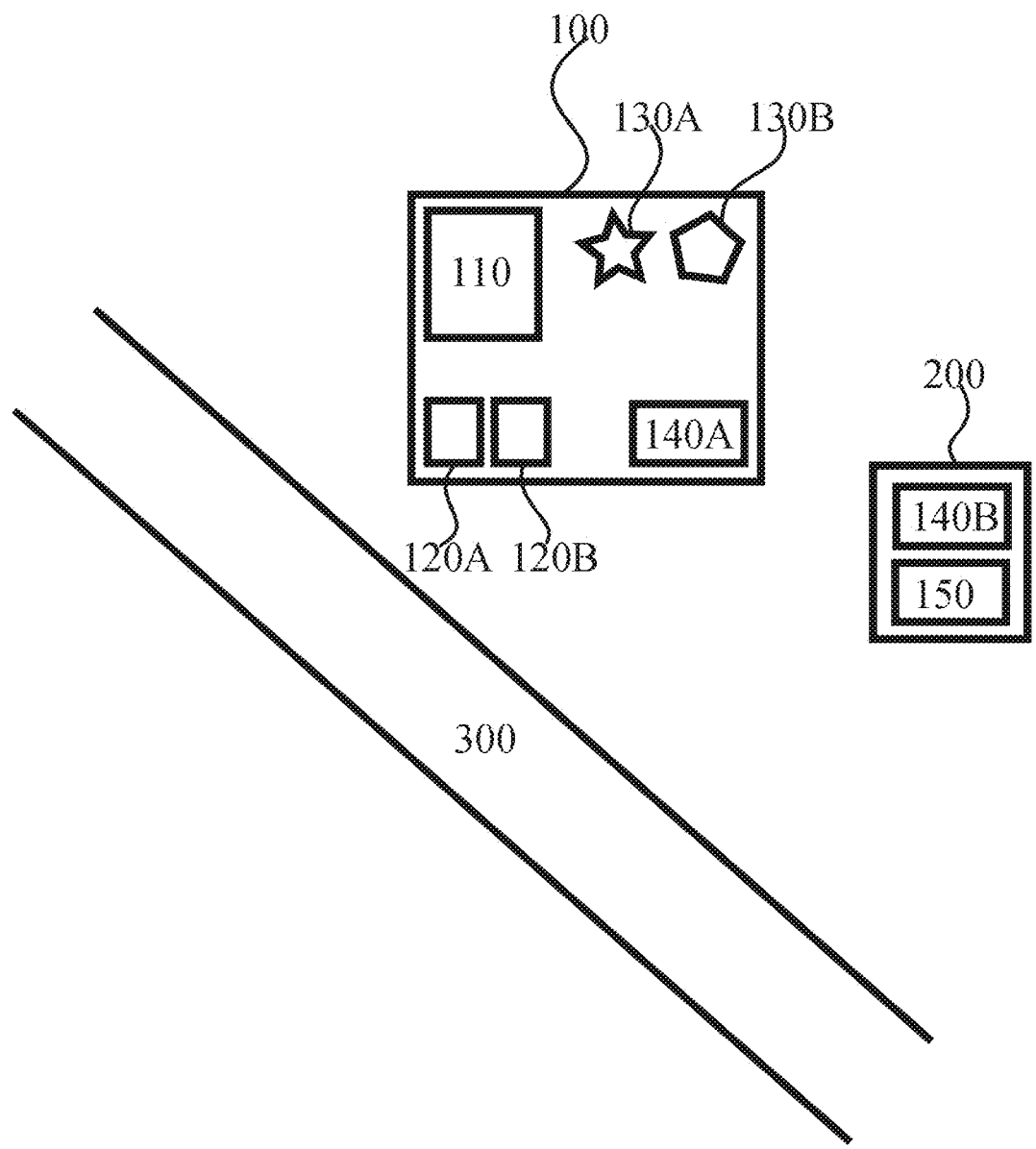
FIG. 1 illustrates an example system capable of supporting at least some embodiments of the present invention.

FIG. 1 illustrates an example system capable of supporting at least some embodiments of the present invention. The system of FIG. 1 is a nuclear power station operating a fission-based reactor, although in other embodiments of the invention, other kinds of systems may be envisioned. The system of FIG. 1 comprises building 100, which houses reactor 110. Building 100 is arranged to draw water for cooling from source 300, which may comprise an ocean, lake, river or other stable source of cooling water, for example. The system of FIG. 1 further comprises building 200, which houses systems not housed in building 100.

A nuclear power station may comprise a large number of systems, a subset of which is illustrated in FIG. 1 to serve the purpose of illustrating the principles underlying the present invention. Systems comprised in a safety critical system may embody at least one design principle, such as for example a safety-related design principle. Examples of design principles include redundancy, diversity, separation, isolation, quality level, reliability level, seismic qualification and environmental condition qualification.

System 120A, which may comprise, for example a pump system, has a redundant system 120B. In other words, system 120A and system 120B are similar and enabled to perform a similar task. Either one, system 120A or system 120B, may alone be capable of performing its task. Systems 120A and 120B may be configured to operate on the same, or similar, principles of action. In general where a similar redundant system or equipment is provided for a given system or equipment, this system or equipment is said to embody redundancy. A system embodying redundancy is more dependable than a system without redundancy, as a redundancy-embodying system can continue operation in case one system develops a fault, since the faulty system, for example system 120A, may be switched off and the task may be assigned to the redundant system, for example system 120B.

System 130A, which may comprise, for example, a safety system, has a hard-wired backup diversity system 130B. In other words, system 130A and system 130B are enabled to perform a similar task. Either one, system 130A or system 130B, may alone be capable of performing its task. Systems 130A and 130B are configured to operate on different principles of action. Since systems 130A and 130B are configured to operate using different principles of action, they are less likely to fail at the same time as a response to an unusual operating condition. For example where these systems comprise safety systems, they may be based on different physical processes having the same overall functional specifications. In other words, designs may be developed independently for system 130A and system 130B. Such independent development may comprise using different design teams, subcontractors, materials and/or principles of action, for example. As a consequence, if system 130A encounters an error in a certain unusual operating condition of the nuclear power station of FIG. 1, it is unlikely that system 130B encounters an error in the same operating condition. In this case, responsibility can be re-assigned from system 130A to system 130B, to obtain uninterrupted and secure operation of the power station.

In general, where a system or equipment embodies diversity this system or equipment may be seen to comprise more than one subsystem, the subsystems being configured to operate on different principles and each being capable of performing the task of the system or equipment. Herein the term "system" may generally be used to refer to an equipment, system, architecture or installation.

System 140A, which may comprise, for example, a control system, has a diversity system 140B. System 140A and system 140B are enabled to perform a similar task. Either system 140A or system 140B may alone be capable of performing its task. System 140B, which may operate based on a same or a different principle as system 140A, is housed in building 200 while system 140A is housed in building 100. That the systems are housed in different buildings, or more generally separate from each other, means the systems embody a separation design principle. Situating the systems separately from each other increases the dependability of the aggregate system comprising system 140A and system 140B, since a problem affecting, say, building 200 may leave building 100 and systems housed therein unaffected. Additionally or alternatively to physical separation, systems may be separated electrically and/or functionally. The intent in separation overall is to avoid failures from progressing from a system to its back-up system, or from one task category to another task category. Electrical separation, for example, may be accomplished by either not connecting the separated systems to each other electrically, or by suitably filtering electrical connections arranged between the systems. Examples of suitable filtering include over-voltage protection, current protection and fibre-optic filters.

Where system 140A and system 140B are based on the same, or a similar, operating principle the system comprising system 140A and system 140B may be considered to embody separation and redundancy. Where system 140A and system 140B are based on different operating principles the system comprising system 140A and system 140B may be considered to embody separation and diversity.

A system embodying the design principle isolation may comprise a system wherein the system, including equipment comprised in the system, is isolated from its surroundings. For example, being disposed inside a reactor containment vessel and/or hardened building provides isolation. Isolation may be defined in various ways, for example, ability to withstand an impact of a passenger aircraft and/or ability to contain a molten reactor core. Among further design principles, a quality level may comprise that a system embodying that design principle meets a standardized quality level. Further, a reliability level, a seismic qualification level and an environmental condition qualification are examples of design principles that may be embodied by systems comprised in safety critical systems.

When designing, maintaining or refitting a safety critical system, it may be advantageous to associate design principles with functional requirements. This association may take place in a task category, which may comprise a database structure, such as an information element, which comprises or is associated with both the functional requirement and at least one design principle. The task category may be associated with hierarchically lower levels of a design in such a way that the design principles associated with the task category are embodied by the aggregate system that performs the functional requirement associated with the task category. The functional requirement associated with the task category may be referred to simply as the functional requirement of the task category. At least in some embodiments, a task category information element does not define structure but is associated, directly or indirectly, with information elements that do define structure. Examples of information element types that define structure include an architecture definition information element and a system-level information element.

When a design principle is associated with a task category, implementing systems to perform the functional requirement of the task category becomes more flexible, allowing more intelligent implementation that may result in a simpler and safer. Requiring that each system and equipment in the system performing the functional requirement separately comply with the design principle is a more restrictive model, where equipment may be duplicated excessively. For example, where an equipment, such as for example a pump, is comprised in a system that performs a functional requirement of a task category, it may be assigned another role in a system that performs a functional requirement of another task category. The pump, for example, may embody diversity with respect to more than one system or task category. In general, a system may embody a design principle with respect to more than one system and/or task category.

In a complex system such as a nuclear power station, or an aircraft, the number of systems and equipments may be very large. To enable use of task categories and associated design principles, a database system may be employed. By database system it is herein meant a physical system configured to store a database, by which it is in turn meant an organized storage or assembly of information elements, which may be interrelated within the database system via associations and/or database relations. The database system may be use a suitable system, such as for example a computer system, and suitable magnetic, solid-state, holographic or other kind of memory. Such a database is illustrated in FIG. 1 as database 150. In the database, functional requirements and design principles may take the form of information elements. A communication network may be considered a further example of a safety critical system, as it may be employed to communicate critical information, such as emergency telephone calls, radar data and/or environmental sensor network data. Examples of communication networks include cellular and fixed networks. A further example of a safety critical system is a power arranged to convey electrical energy from generating stations to industry and consumers.

Figure 2:
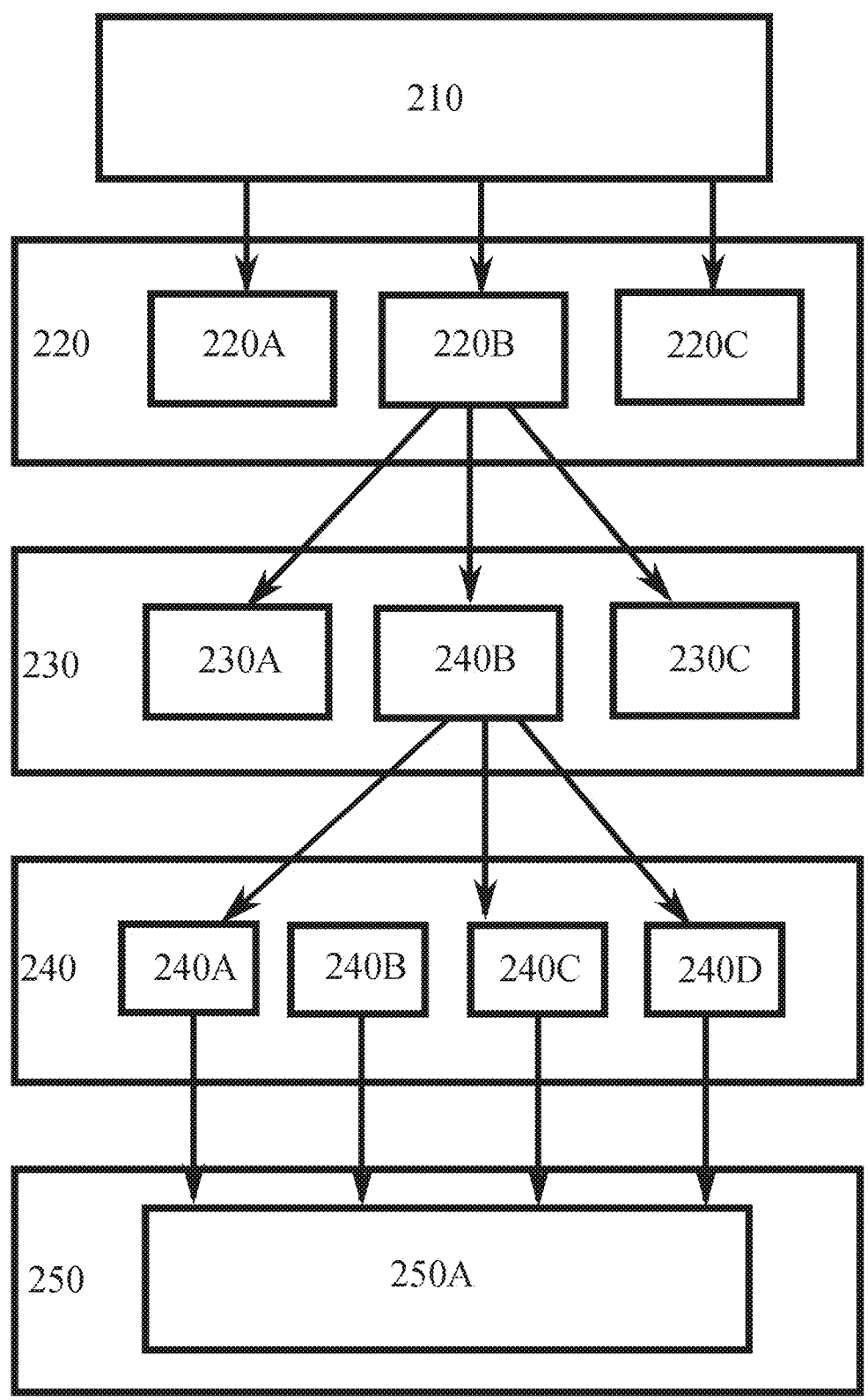
FIG. 2 illustrates an example database hierarchy in accordance with at least some embodiments of the present invention.

In database 150, information elements may be arranged in a hierarchical structure which is illustrated in FIG. 2.

FIG. 2 illustrates an example database hierarchy in accordance with at least some embodiments of the present invention. The example database hierarchy of FIG. 2 involves a database hierarchy of a nuclear power station. At the top level are disposed nuclear safety design requirements 210. These requirements may be derived from and/or be based on regulatory requirements, codes and/or standards. In some embodiments, nuclear safety design requirements 210 are absent from the database, for example where their content is taken into account, implicitly or explicitly, in other layers.

The requirements of requirement layer 210 may be associated with, or comprised in, task categories in layer 220, which corresponds to the level of the entire nuclear power station. Layer 220 may be termed the plant layer. Each task category may be associated with at least one design principle and at least one functional requirement, as described above. In detail, each task category may, in some embodiments, be associated with one and only one functional requirement and at least one design principle. Task categories included in the example of FIG. 2 are task categories 220A, 220B and 220C. In the database, task categories may be present as task category information elements.

Examples of task categories comprise preventive safety function, reactor protection and automatic back-up. Examples of functional requirements comprise accident frequency, pollutant leakage rate, maintenance intervals and emergency landing frequency of an aircraft.

Under plant layer 220 is disposed architecture layer 230. Layer 230 may comprise architecture definition information elements, at least some such information elements being associated with at least one task category information element on level 220. The architecture definition information elements may comprise indications as to the way in which the architecture therein defined contributes to embodiment of the design principles associated with associated task categories. In other words, the architecture definition information elements may comprise information as to how the design principles of the higher-level task categories are implemented in the architecture level. Architecture definition information elements included in the example of FIG. 2 are architecture definition information elements 230A, 230B and 230C.

Examples of architectures include functional architecture, automation architecture, process and electrical architecture, control room architecture and layout architecture. Functional architecture may describe how the main processes of the plant are implemented. Automation architecture may describe how automation mechanisms are arranged in the plant. Process and electrical architecture may describe how processes and electrical systems are designed on the high level. Control room architecture may describe how the control room is arranged to control functioning of the plant, and layout architecture may describe how systems of the plant are distributed among buildings comprised in the plant.

Under architecture layer 230 is disposed system layer 240. System layer 240 may comprise system-level information elements, each such information element being associated with at least one architecture definition information element on level 230. The system-level information elements may comprise indications as to the way in which the systems therein defined contribute to embodiment of the design principles associated with associated task categories, wherein task categories are associated with system-level information elements via architecture definition information elements on architecture level 230. System-level information elements included in the example of FIG. 2 are system-level information elements 240A, 240B, 240C and 240D.

Examples of systems include preventive protection system, preventive actuation and indication system, safety injection system, emergency power supply system, digital human-machine interface, HMI, system and automatic backup system.

Under system layer 240 is disposed equipment layer 250. Equipment layer 250 may comprise equipment-level information elements, each such information element being associated with at least one system-level information element on level 240. The equipment-level information elements may comprise indications as to the way in which the equipment therein defined contribute to embodiment of the design principles associated with associated task categories, wherein task categories are associated with equipment-level information elements via system-level information elements on system layer 240 and architecture definition information elements on architecture level 230. Equipment-level information elements are illustrated in FIG. 2 collectively as elements 250A.

In some embodiments, regulatory requirements may be assigned to individual systems or pieces of equipment. Such system-level or equipment-level regulatory requirements may be recorded in system-level or equipment-level information elements and used as additional constraints in implementing methods in accordance with the present invention.

Using the hierarchical database system described above it can be determined, which pieces of equipment in the plant contribute to which plant-level functional requirements and design principles. As a consequence, when a piece of equipment is replaced with a new type of equipment, it can be assessed, what the implications are for the plant or aircraft overall in terms of design principles. For example, where a computer is replaced with a new kind of computer, for example, a computer based on a complex instruction set computing, CISC, processor is replaced with a computer based on a reduced instruction set computing, RISC, processor, the new computer may be able to perform as a diversity computer to an already present CISC computer in the plant. In this case, installing the RISC computer to replace an older computer may enable removal of a further computer from the plant, the diversity role of the further computer being thereafter performed by the new computer. The further computer may be comprised in a different system or architecture, and it may be associated with a different task category than the old computer the new RISC computer replaces, for example.

Running the database system as described above may at least in part automate such design considerations of the safety critical system. Each equipment-level information element storing or being associated with information describing each role the described equipment performs in the plant, a user may interact with the database system to identify whether replacing the piece of equipment with a new piece of equipment enables a simplification in the overall system, or whether characteristics of the new piece of equipment necessitate a further modification to the overall system.

A further modification may be necessary where, for example, the new piece of equipment is unable to perform a role the previous piece of equipment performed, for example as a redundancy or diversity element to a further piece of equipment, which may be comprised in a different system or architecture. Thus instead of assigning requirements to individual pieces of equipment, design principles are associated with task categories to enable smart plant management and selection of replacement pieces of equipment in such a way that the plant overall may be simplified. A simplified plant provides the technical effect that running it consumes less energy, for example. Further modification may be required in cases where regulatory requirements have changed between initial construction and refit of a safety critical system.

Similarly, using the database system enables a fuller understanding of fault conditions, since the database system identifies the roles each piece of equipment registered therein performs. Therefore, when a piece of equipment develops a fault, it can be identified, using the database system, which other systems have less redundancy as a consequence of the fault.

Figure 3:
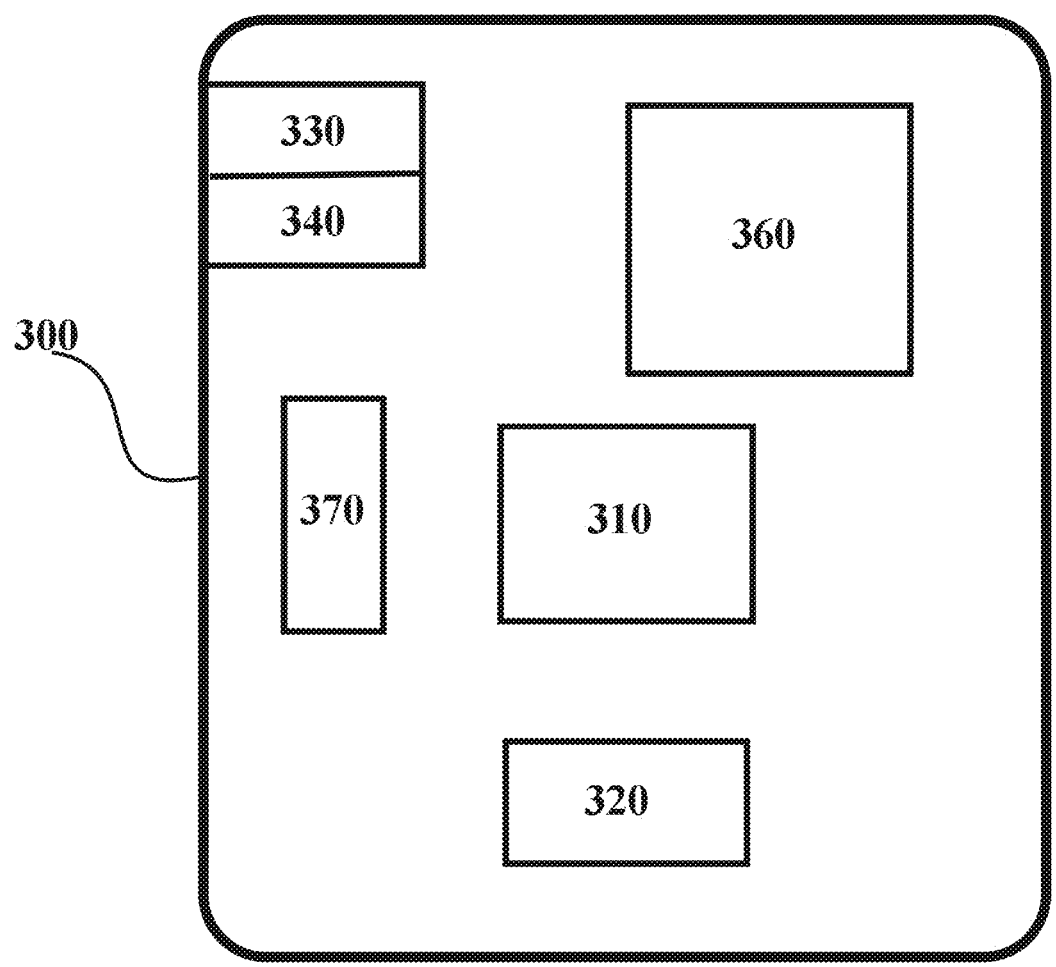
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device such as database system 150 of FIGURE. Comprised in device 300 is processor 310, which may comprise, for example, a single- or multi-core processor wherein a single-core processor comprises one processing core and a multi-core processor comprises more than one processing core. Processor 310 may comprise a Xeon or Opteron processor, for example. Processor 310 may comprise more than one processor. A processing core may comprise, for example, a Cortex-A8 processing core manufactured by ARM Holdings or a Bulldozer processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be configured to store information elements of a database system, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one communication standard. Transmitter 330 may comprise more than one transmitter. Receiver 340 may comprise more than one receiver. Transmitter 330 and/or receiver 340 may be configured to operate in accordance with wireless local area network, WLAN, Ethernet and/or worldwide interoperability for microwave access, WiMAX, standards, for example.

Device 300 may comprise user interface, UI, 360. UI 360 may comprise at least one of a display, a keyboard and a touchscreen. A user may be able to operate device 300 via UI 360, for example to interact with a database system comprised in, or controlled by, device 300.

Device 300 may comprise or be arranged to accept a user identity module 370. User identity module 370 may comprise, for example, a secure element. A user identity module 370 may comprise cryptographic information usable to verify the identity of a user of device 300 and/or to facilitate encryption and decryption of database contents.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Processor 310, memory 320, transmitter 330, receiver 340, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
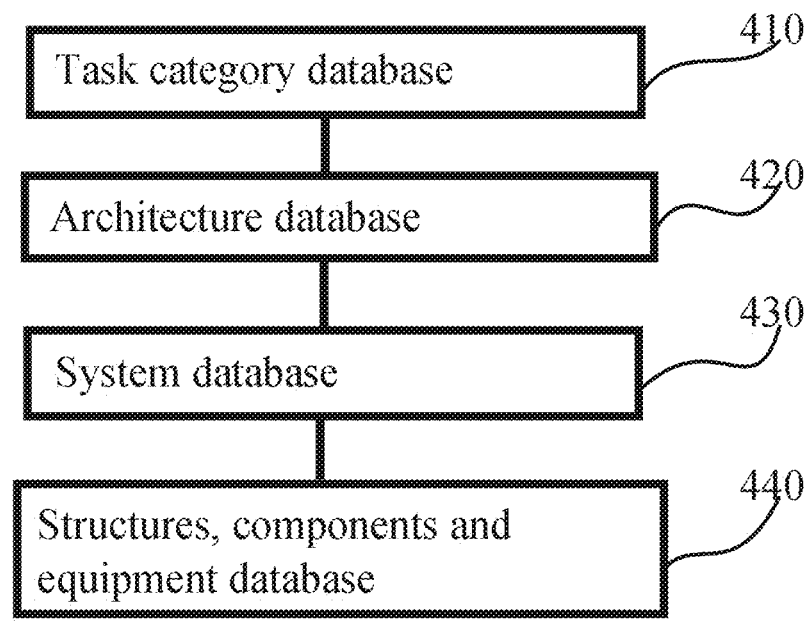
FIG. 4 illustrates an example database structure in accordance with at least some embodiments of the present invention.

FIG. 4 illustrates an example database structure in accordance with at least some embodiments of the present invention. Layer 410 corresponds in terms of FIG. 2 to the task category layer, storing task category information elements. Layer 420 corresponds in terms of FIG. 2 to the architecture layer, storing architecture definition information elements. Layer 430 corresponds in terms of FIG. 2 to the system layer, storing system-level information elements. Finally, layer 440 corresponds in terms of FIG. 2 to the equipment layer, storing equipment-level information elements. A database relation layer may be disposed between layer 410 and layer 420, between layer 420 and layer 430, and/or between layer 430 and layer 440.

Figure 5:
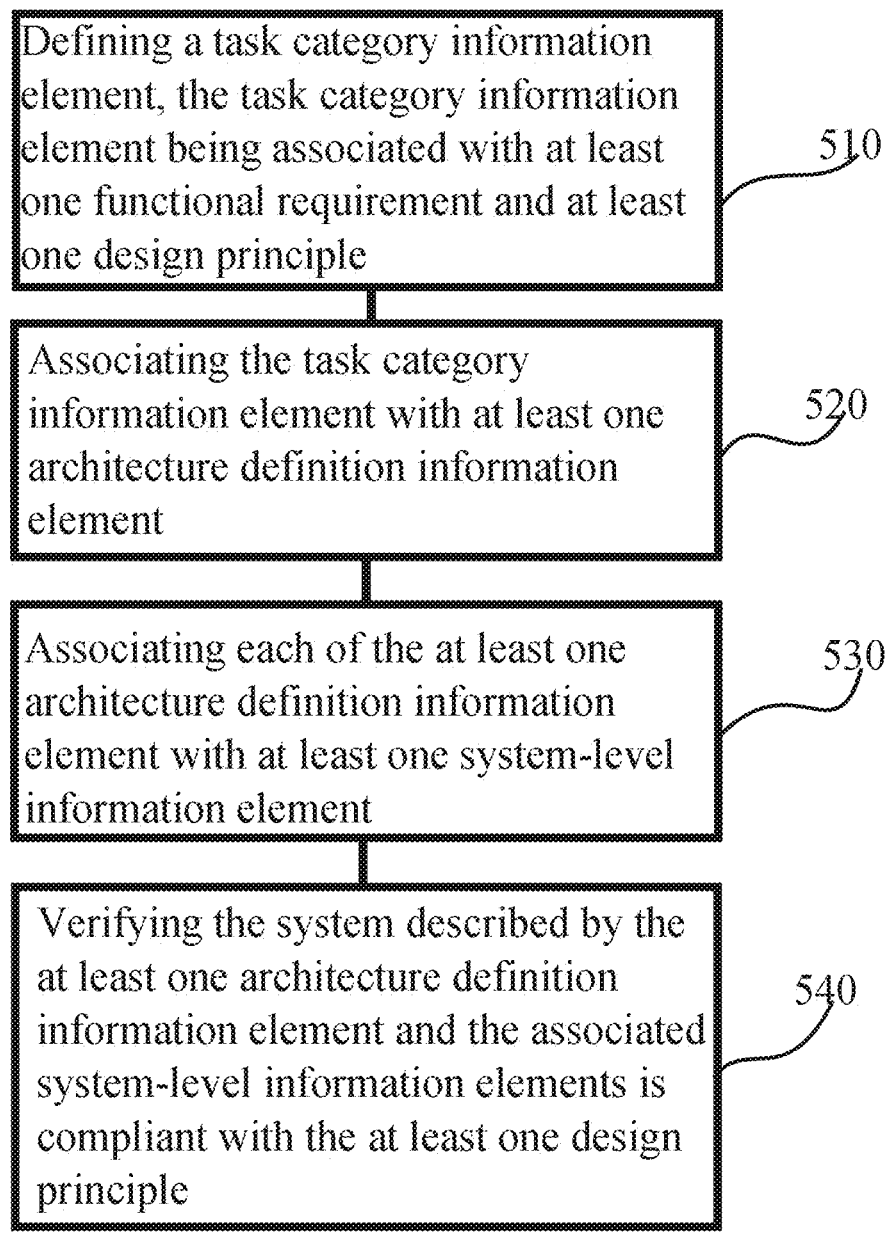
FIG. 5 is a first flow chart of a first method in accordance with at least some embodiments of the present invention.

FIG. 5 is a first flow chart of a first method in accordance with at least some embodiments of the present invention. The phases of the illustrated method may be performed in database 150 of FIG. 1 or on device 300 of FIG. 3, for example.

Phase 510 comprises defining a task category information element, the task category information element being associated with at least one functional requirement and at least one design principle. Phase 520 comprises associating the task category information element with at least one architecture definition information element. Phase 530 comprises associating each of the at least one architecture definition information element with at least one system-level information element. Finally, phase 540 comprises verifying the system described by the at least one architecture definition information element and associated system-level information elements is compliant with the at least one design principle.

Figure 6:
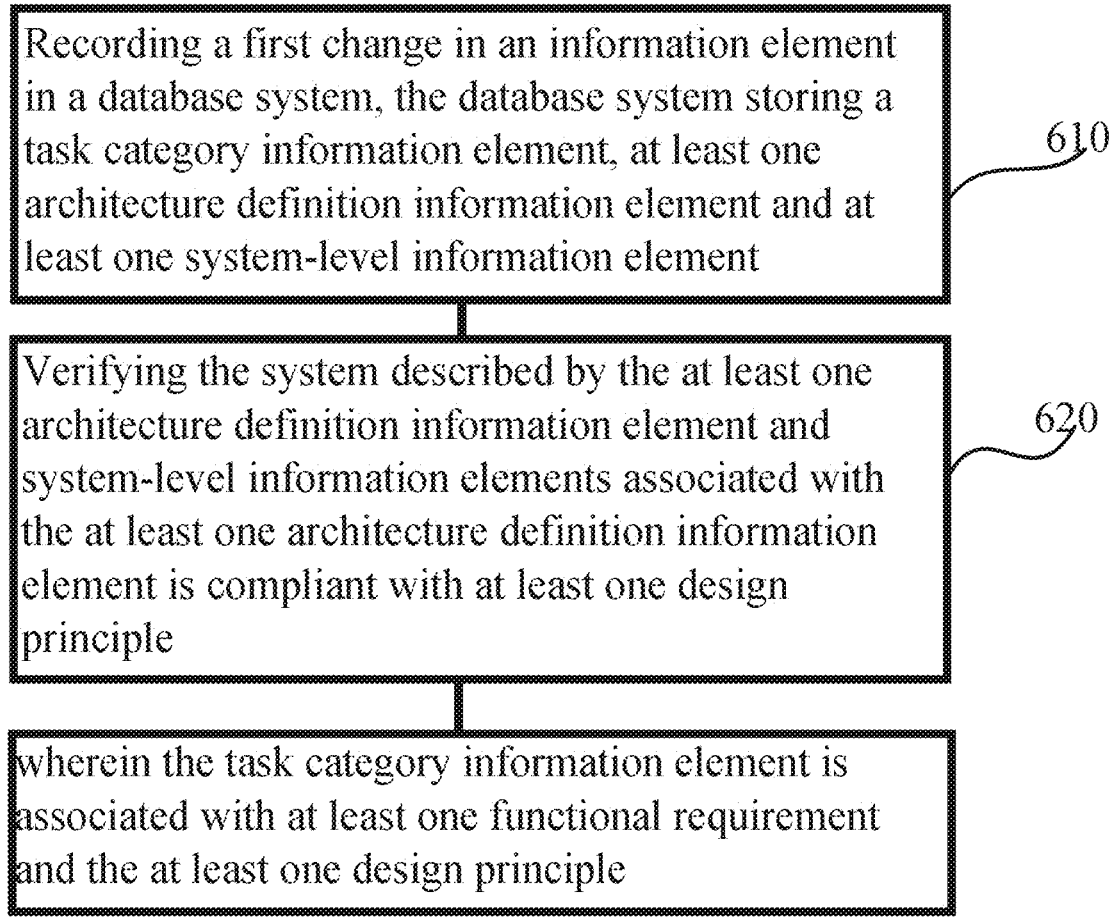
FIG. 6 is a second flow chart of a second method in accordance with at least some embodiments of the present invention.

FIG. 6 is a second flow chart of a second method in accordance with at least some embodiments of the present invention. The phases of the illustrated method may be performed in database 150 of FIG. 1 or on device 300 of FIG. 3, for example.

Phase 610 comprises recording a first change in an information element in a database system, the database system storing a task category information element, at least one architecture definition information element and at least one system-level information element. Phase 620 comprises verifying the system described by the at least one architecture definition information element and system-level information elements associated with the at least one architecture definition information element is compliant with at least one design principle, wherein the task category information element is associated with at least one functional requirement and at the least one design principle.

In general, there is provided a method, comprising defining a task category information element, the task category information element being associated with at least one functional requirement and at least one design principle, associating the task category information element with at least one architecture definition information element, associating each of the at least one architecture definition information element with at least one system-level information element, and verifying the system described by the at least one architecture definition information element and associated system-level information elements is compliant with the at least one design principle. The method may be performed using a database system, for example. The associating phases comprised in the method may comprise defining information element association properties in the database system. The verifying may comprise running a verification algorithm on the information elements comprised in the database system.

The verifying may comprise checking that for each design principle, the architecture, systems and pieces of equipment associated with the design principle together embody the design principle. The verifying does not, in some embodiments, require that each information element directly or indirectly associated with the design principle embodies the design principle. For example, where the design principle comprises redundancy, not all pieces of equipment directly or indirectly associated with a task category associated with redundancy need be made redundant in the sense of installing duplicate pieces of equipment. In these embodiments, it suffices that the function defined by the associated information elements as a whole is redundant. In other words, should any individual piece of equipment comprised in this function fail, its purpose may be served by another piece of equipment which need not be identical to it, and need not be comprised in the function in question. The safety critical system may comprise systems or pieces of equipment that do not need redundancy or diversity, for example. The information elements describing these pieces of equipment may comprise information indicating the way in which the design principle is implemented with respect to the functions of these pieces of equipment.

In at least some embodiments, the database system stores sequence information elements, each sequence information element describing a sequence of actions, each sequence information element being associated with a triggering event and each sequence information element being associated with a task category information element. The sequence may control the consequences of the occurrence of the event. For example, an event may comprise a point failure in a system or an interruption in cooling water supply, and the sequence of actions may comprise a pre-planned response to the event whereby the consequences of the event are controlled.

Figure 7:
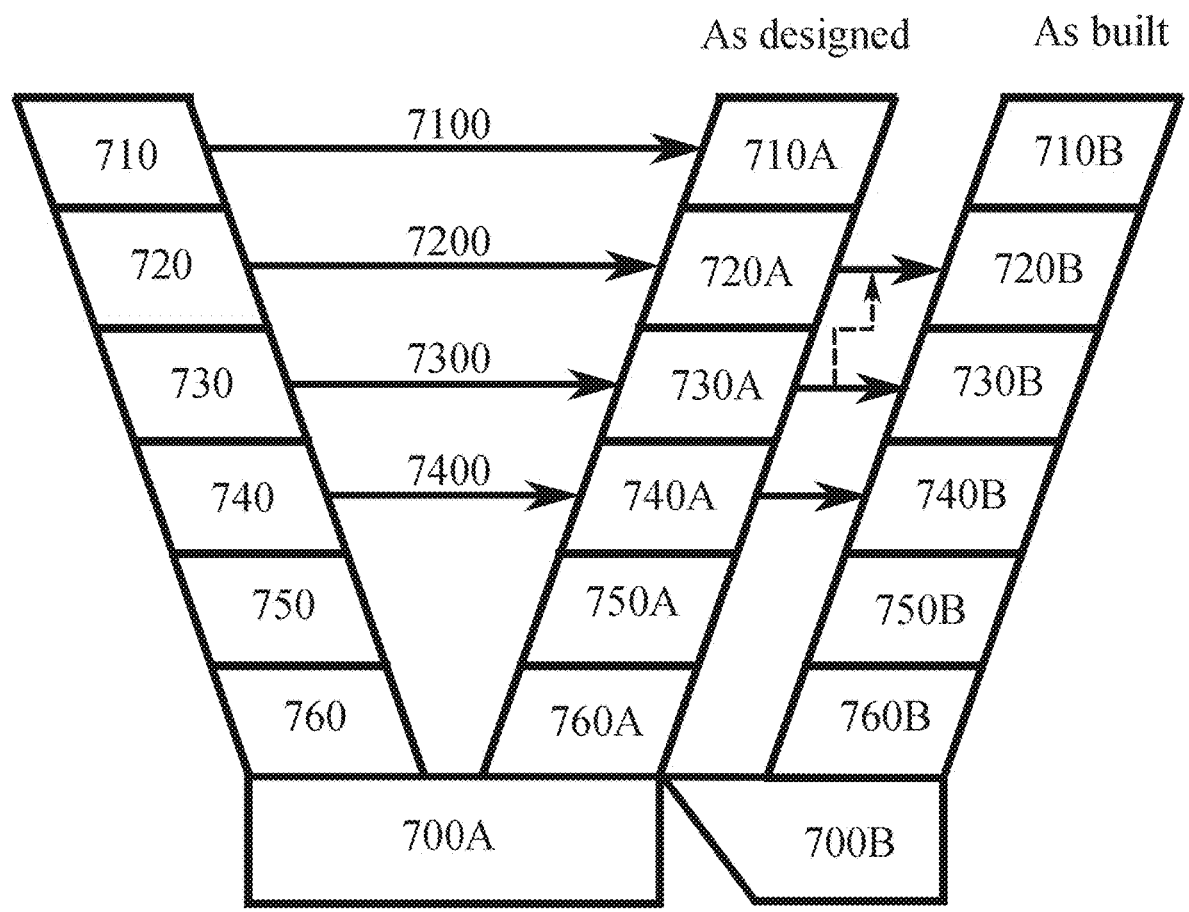
FIG. 7 illustrates example design verification in accordance with at least some embodiments of the present invention.

FIG. 7 illustrates example design verification in accordance with at least some embodiments of the present invention. Of the W-shaped FIG. 7, the left-most prong corresponds to architecture of a power plant, the mid prong corresponds to verification of the plant as designed, and finally the right-most prong corresponds to verification of a completed, built plant.

Unit 710 is an accident management plan, which is verified in a plan for accident management plan review 7100, leading to a preliminary independent review 710A in the as-designed phase. A corresponding final independent review 710B is conducted in the as-built phase.

Unit 720 is a functional architecture, which forms a basis for other architectures. Functional architecture 720 can be divided, for example, into short term and long term event progression architectures, describing plant specific safety functions on a general level. Functional architecture is verified in a review 7200, resulting in a preliminary safety analysis 720A in the as-designed phase and a final safety analysis 720B in the as-built phase.

Unit 730 is an automation architecture, which may describe how task category functional requirements and/or safety functions are divided to automation systems so that design principles are met. Automation architecture is verified in a review 7300, resulting in an interface analysis 730A in the as-designed phase and interconnected tests 730B in the as-built phase. The interconnected tests 730B may be derived in part jointly with final safety analysis 720B.

Unit 740 is a control room and procedures architecture, which may describe safety and ergonomics requirements for human-machine interfaces, HMI, control room and procedures. Control room and procedures architecture 740 is verified in a review 7400, resulting in task support verification 740A in the as-designed phase and integrated systems validation 740B in the as-built phase.

Process architecture 750 corresponds to interface analysis 750A in the as-designed phase and plant start-up tests 750B in the as-built phase. System performance criteria 760 are developed into system-specific tests 760A in the as-designed phase and system-specific tests 760B in the as-built phase. System performance criteria 760 together with system-specific tests 760A and 760B correspond to system-level verification.

700A denotes the left-most and center prongs, which correspond to plant-level architecture and design, and 700B corresponds to basic design, detailed design and realisation. Overall, the database system comprising task category information elements, architecture definition information elements, system-level information elements and equipment-level information elements enables verifying the design correctly embodies the design principles associated with the task category information elements.

At at least in some embodiments, where a piece of equipment is associated with two task categories having different design principles, the more stringent design principle, safety class or quality requirement may be arranged to prevail concerning the function of the piece of equipment. For example, diversity may be seen as more stringent than redundancy, since in addition to another unit, an additional requirement of different operating principle is assigned to the units. As another example, where differing environmental safety requirements apply, the more stringent requirement may be arranged to prevail.

In some embodiments of the invention, a computerized monitoring system is provided, wherein the computerized monitoring system is configured to receive, from the nuclear power station or aircraft, failure notifications. Each failure notification may relate to a failure of an item of equipment, for example one represented by an equipment information element, a system-level information element and/or an architecture information element in a database arranged in accordance with the principles of the present invention. The failure notifications may be automatically generated from sensors arranged to monitor how equipment comprised in the nuclear power station or aircraft perform, for example.

The computerized monitoring system may be configured to, responsive to a failure notification, determine, using a database such as one described above, an effect of the failure on how a design principle is complied with. A design principle may comprise at least one of the following: redundancy, diversity, separation, isolation, quality level, reliability level, seismic qualification and environmental condition qualification. For example, where an item of equipment fails, and the failed equipment played a role in providing for a design principle with respect to another item of equipment, a visual or other kind of indication may be provided, the indication conveying that the design principle is not sufficiently provided for as it relates to the another item of equipment.

Thus, for example, where a first equipment fails and the first equipment provided, prior to the failure, at least partly, redundancy for a second equipment, the computerized monitoring system may determine the redundancy effect of the failure of the first equipment, using the task category associated with the functional requirement and the at least one design principle to determine the systems and/or equipments the redundancy of which is affected by the failure. An indication may be provided of a reduced redundancy level, and the systems and/or pieces of equipment that the reduced redundancy level affects. The reduced redundancy level is a technical characteristic of the nuclear power station or aircraft and the equipments comprised therein.

The first equipment corresponds in the database to a corresponding first equipment information element. Where the first equipment information element is associated, via database relations, to more than one task category information element in the database, the computerized monitoring system may be configured to determine a set comprising each design principle associated with each task category information element associated, via database relations, with the first equipment information element, and to identify, based on each design principle comprised in the set, a technical constraint of an action compensating, at least partly, effects of the failure identifier in the failure notification.

Thus, for example, where a pump in a nuclear power station develops a failure, a sensor comprised in the pump may provide a failure notification to the computerized monitoring system. Responsive to the failure notification, the computerized monitoring system may determine that an equipment information element in the database corresponding to the pump is associated, via database relations, with the task category information elements corresponding to the task categories safety function and reactor protection. In this example, task category safety function is associated with design principles redundancy and diversity, and task category reactor protection is associated with design principles redundancy, diversity and separation. Thus, the set of design principles comprises redundancy, diversity and separation.

The computerized monitoring system may further be configured to identify, based on each technical design principle comprised in the set, a technical constraint of an action compensating, at least partly, effects of the failure associated with the failure notification. In the example above, compensating actions would be constrained with respect to equipment unit count to meet the design principle redundancy, equipment principle of action to meet the design principle diversity, and equipment location to meet the design principle separation.

Thus in accordance with the invention, personnel are enabled to become aware of which aspects of a failed piece of equipment are relevant for safe operation of the nuclear power station, for example. Expressed in other words, the computerized monitoring system is configured to provide information concerning the operational status of the nuclear power station, and deviations from a nominal operational status that result from the failure.

A technical effect provided by the computerized monitoring system and associated database lies in enabling reaction to the actually relevant aspects of an equipment that has developed a failure. In prior systems, a decision tree may be employed, for example. However, a decision tree in the case of a nuclear power station is very difficult to maintain due to the highly complex nature of such a station. Furthermore, a decision tree does typically not provide information on the actual aspects of a failed equipment that are of significance, rather, a decision tree simply informs concerning actions needed to replace the failed equipment with an identical one. The constraints described herein, on the other hand, enable reacting to a failure in a way that addresses the technical situation, rather than requires simple duplication of an original design and like-for-like replacement of a failed piece of equipment. A like-for-like replacement may be unavailable in case the type of equipment is no longer in production. Furthermore, a like-for-like replacement may be less preferable than a more modern piece of equipment, which may be more energy-efficient, for example. A modern piece of equipment may furthermore be enabled to assume more roles in terms of redundancy or diversity in the overall system.

In a communication network, task categories may include, for example, a switching failure elimination task category and a privacy task category. The switching failure elimination may relate to connecting connections, such as telephone calls, for example, correctly, while privacy may relate, for example, to confidentiality of communicated information and/or subscriber data. Further, resource management may be a task category, whereby radio or trunk resources are allocated in a suitable way to communications routed through the network.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, described features, structures, or characteristics may be combined in any suitable or technically feasible manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A computerized nuclear power station monitoring system, comprising:
    a memory configured to store a database comprising a task category database comprising plurality of task category information elements comprising a safety function information element and a reactor protection information element, each task category information element being associated with at least one technical functional requirement and at least one technical design principle, each technical design principle being comprised in a technical design principle list, the technical design principle list comprising redundancy, diversity, separation and isolation, each functional requirement being comprised in a functional requirement list, the functional requirement list comprising reactivity control, core cooling and safe shut-down, and an equipment database configured to store at least one equipment information element, and at least one processor configured to, responsive to receipt in the computerized monitoring system of a failure notification concerning a first equipment information element, determine, using the database, a set comprising each technical design principle associated with each task category information element associated, via database relations, with the first equipment information element, and to identify, based on each technical design principle comprised in the set, a technical constraint of an equipment replacement action compensating, at least partly, effects of a failure identified in the failure notification and to provide information to personnel concerning the technical constraint.

2. The computerized monitoring system of claim 1, wherein the at least one processor is configured to determine a constraint of increased unit count responsive to the set comprising the technical design principle redundancy.

3. The computerized monitoring system of claim 1, wherein the at least one processor is configured to determine a constraint of principle of action responsive to the set comprising the technical design principle diversity.

4. The computerized monitoring system of claim 1, wherein the at least one processor is configured to determine a constraint of location responsive to the set comprising the technical design principle separation.

5. The computerized monitoring system of claim 1, wherein the at least one processor is configured to determine a constraint of physical separation responsive to the set comprising the technical design principle isolation.

6. The computerized monitoring system of claim 1, wherein the at least one processor is further configured to provide an indication of the determined constraints.

7. A method in a computerized nuclear power station monitoring system, comprising:

storing a database comprising a task category database comprising a plurality of task category information elements comprising a safety function information element and a reactor protection information element, each task category information element being associated with at least one technical functional requirement and at least one technical design principle, each technical design principle being comprised in a technical design principle list, the technical design principle list comprising redundancy, diversity, separation and isolation, each functional requirement being comprised in a functional requirement list, the functional requirement list comprising reactivity control, core cooling and safe shut-down, and an equipment database configured to store at least one equipment information element;

determining, responsive to receipt in the computerized monitoring system of a failure notification concerning a first equipment information element, using the database, a set comprising each technical design principle associated with each task category information element associated, via database relations, with the first equipment information element, and identifying, based on each technical design principle comprised in the set, a technical constraint of an equipment replacement action compensating, at least partly, effects of a failure identified in the failure notification and providing information to personnel concerning the technical constraint.

8. A non-transitory computer readable medium having stored thereon a set of computer readable instructions that, when executed by at least one processor, cause an apparatus to at least:

store a database comprising a task category database comprising a plurality of task category information elements comprising a safety function information element and a reactor protection information element, each task category information element being associated with at least one technical functional requirement and at least one technical design principle, each technical design principle being comprised in a technical design principle list, the technical design principle list comprising redundancy, diversity, separation and isolation, each functional requirement being comprised in a functional requirement list, the functional requirement list comprising reactivity control, core cooling and safe shut-down, and an equipment database configured to store at least one equipment information element;

determine, responsive to receipt in the computerized monitoring system of a failure notification concerning a first equipment information element, using the database, a set comprising each technical design principle associated with each task category information element associated, via database relations, with the first equipment information element, and identify, based on each technical design principle comprised in the set, a technical constraint of an equipment replacement action compensating, at least partly, effects of a failure identified in the failure notification and provide information to personnel concerning the technical constraint.

* * * * *